3,150,112
AQUEOUS POLYMER DISPERSIONS CONTAINING AN EPIHALOHYDRIN
Walter W. Toy, Philadelphia, Pa., assignor to Rohm & Haas Company, Philadelphia, Pa., a corporation of Delaware
No Drawing. Filed Oct. 2, 1959, Ser. No. 843,916
19 Claims. (Cl. 260—29.6)

This invention relates to aqueous polymer dispersions and is particularly concerned with aqueous dispersions of linear addition polymers which are water-insoluble but contain certain neutral carboxylate salt groups or certain groups having reactive hydrogen therein, in which there is present a compound which is adapted to render formed masses made of the dispersion resistant to solvents and to heat. This application is a continuation-in-part of my copending U.S. application for patent Serial No. 688,445, filed October 7, 1957, now abandoned.

It is already known to include within aqueous dispersions of water-insoluble linear polymers resin-forming condensates such as those of urea-formaldehyde or melamine-formaldehyde for the purpose of cross-linking the polymer in any masses deposited from the dispersion by subjecting such masses to baking temperatures. In many cases, it is disadvantageous or even out of the question to employ elevated baking temperatures that are sometimes required of such compositions.

In accordance with the present invention, it has been found that aqueous dispersions of water-insoluble linear addition polymers obtained by emulsion polymerization from monomers formed exclusively of carbon, hydrogen, nitrogen, sulfur and oxygen atoms which contain COOM groups in which M is selected from the group consisting of $NH_4$, alkali metals, and radicals formed by neutralization of a COOH group by a water-soluble amine or groups having reactive hydrogen atoms selected from the group consisting of alcoholic hydroxyl, primary amine, secondary amine, and amide groups, can be modified by the incorporation of an epihalohydrin without interfering with the normal stability of such dispersions and that such modified compositions can be used to form various masses including coatings and impregnations which become resistant to solvents and heat even when the deposition is effected at normal room temperature and at normal drying temperatures so that generally elevated baking temperatures are unnecessary. The fact that the dispersions retain their stability is surprising since it is well known that epihalohydrins react with alcohols and acids even at room temperature. Examples of epihalohydrins include epichlorohydrin, epibromohydrin, and epiiodohydrin.

In accordance with the present invention, the epihalohydrin may be added to an aqueous dispersion of polymers which contain any of the groups mentioned hereinabove. In some cases, when the monomer contains sufficient hydrophobic components, homopolymers of the monomers specified above may be employed in making the aqueous dispersions providing such homopolymers are water-insoluble. Generally, the most important type of composition with which the invention is concerned is that formed of a copolymer containing the groups which have reactive hydrogen and in most cases the copolymer may contain from ½ to 30 mole percent of units which have the reactive hydrogen-containing groups. When the monomers are neutral salts containing the COOM groups mentioned above, the preferred proportion is generally from ½ to 3 mole percent of such units; whereas when units containing reactive hydrogen-containing groups are employed, the preferred proportion is generally from about 3 to 10 mole percent of such units. The amount of epihalohydrin added is from about 0.5% to 30% by weight based on the weight of the polymer.

The salt units may be obtained by polymerization of the neutral salts of any of the monomeric α-methylene monocarboxylic acids, such as acrylic or methacrylic acids. There may also be used salts of crotonic acid, β-carboxyethyl acrylate or methacrylate, and such polybasic acids as itaconic, maleic, fumaric, and aconitic acids. Instead of directly polymerizing the salts, the water-insoluble products containing COOM groups used in the invention may be made by neutralization, with ammonium hydroxide, an alkali metal hydroxide, or a water-soluble amine, of a copolymer of any one or more of the acids mentioned. Anhydrides of the acids such as maleic anhydride may be used to introduce the acid groups into the polymers and monoesters of the aforesaid dicarboxylic acids such as monomethyl maleate may be used and the polymers can then be neutralized.

Examples of hydroxyl-containing monomers include glyceryl methacrylate or acrylate, β-hydroxyethyl vinyl sulfide, β-hydroxyethyl vinyl ether, γ-hydroxypropyl vinyl sulfide, 5-hydroxypentyl vinyl ether, 6-hydroxyhexyl vinyl ether, 8-hydroxyoctyl vinyl ether, 10-hydroxydecylvinyl ether, β-hydroxyethylaminoethyl vinyl ether, (N-β-hydroxyethyl-N-methyl)aminoethyl vinyl ether, hydroxyethyldimethyl(vinyloxyethyl)ammonium hydroxide, thiodiglycol monovinyl ether, diethyleneglycol monovinyl ether, β-hydroxyethyl acrylate, β-hydroxyethyl methacrylate, N-β-hydroxyethyl acrylamide, N-β-hydroxyethyl methacrylamide, N-β-hydroxypropyl methacrylamide, N-β-hydroxypropyl acrylamide, β-hydroxyethoxyethyl acrylate, β-hydroxyethoxyethyl methacrylate, γ-hydroxypropyl acrylate, γ-hydroxypropyl methacrylate, β-hydroxypropyl acrylate, β-hydroxypropyl methacrylate, 6-hydroxyhexyl methacrylate, and 6-hydroxyhexyl acrylate.

Examples of amides include:

Acrylamide and methacrylamide
N-methyl-acrylamide and -methacrylamide
N-ethyl acrylamide and -methacrylamide
N-n-propyl-acrylamide and -methacrylamide
N-isopropyl-acrylamide and -methacrylamide
N-butyl-acrylamide and -methacrylamide
N-hexyl-acrylamide and -methacrylamide
N-cyclohexyl-acrylamide and -methacrylamide
N-benzyl-acrylamide and -methacrylamide
N-phenyl-acrylamide and -methacrylamide
N-t-octyl acrylamide and -methacrylamide
N-decyl-acrylamide and -methacrylamide
N-dodecyl-acrylamide and -methacrylamide
N-hexadecyl-acrylamide and -methacrylamide
N-octadecyl acrylamide and -methacrylamide
N-ethoxyethyl-acrylamide and -methacrylamide Examples of amines include:

N-(γ-monomethylamino)propyl methacrylamide
N-(β-monomethylamino)ethyl acrylamide
N-(β-monomethylamino)ethyl methacrylamide
10-aminodecyl vinyl ether
8-aminooctyl vinyl ether
Monoethylaminohexyl methacrylate
Monoethylaminohexyl vinyl ether
5-aminopentyl vinyl ether
3-aminopropyl vinyl ether
2-aminoethyl vinyl ether
2-aminobutyl vinyl ether
4-aminobutyl vinyl ether
2-aminoethyl vinyl ether
Monoethylaminoethyl methacrylate
Monoethylaminoethyl vinyl ether
N-(3,5,5-trimethylhexyl)aminoethyl vinyl ether
N-cyclohexylaminoethyl vinyl ether
t-Butylaminoethyl acrylate
2-(1,1,3,3-tetramethylbutylamino)ethyl methacrylate
N-t-butylaminoethyl vinyl ether
N-methylaminoethyl vinyl ether
N-2-ethylhexylaminoethyl vinyl ether
N-t-octylaminoethyl vinyl ether Many of the above COOM-containing and reactive hydrogen-containing compounds may be generically defined in the following Formulas I, II, and III:

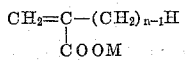   (I)

M being defined as hereinabove,

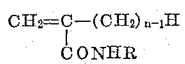   (II)

and

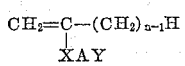   (III)

where
$n$ is an integer having a value of 1 to 2,
R is selected from the group consisting of hydrogen, phenyl, benzyl, cyclohexyl, and alkyl having 1 to 18 carbon atoms,
X is selected from the group consisting of O, S, and

A is an alkylene group having 2 to 18 carbon atoms of which at least two extend in a chain between X and Y, and
Y is selected from the group consisting of —OH, —NHR, and —COOH.

Instead of an alkylene group, A may represent a chain of 2- or 3-carbon-atom alkylene groups connected by oxygen, sulfur, or the imino (—NH—) radical. The preferred compounds of Formula III are those in which the A represents a two-carbon to three-carbon atom alkylene group.

When comonomers of other types, that is, lacking COOM groups and reactive hydrogen atoms of the type herein defined, are employed, they may be any of the following: the acrylic and alpha-alkyl acrylic esters of saturated aliphatic monohydric alcohols, especially of saturated aliphatic monohydric alcohols, e.g., the methyl, ethyl, propyl, isopropyl, butyl, isobutyl, and amyl esters of acrylic, methacrylic, ethacrylic, propacrylic; the phenyl, benzyl, and phenylethyl esters of the aforementioned acids; vinyl aromatic compounds, e.g., styrene, alpha-methyl styrene, dimethylstyrenes, the various cyanostyrenes, the various methoxystyrenes, vinyl naphthalenes, e.g., alkyl vinyl ketones, e.g., methyl vinyl ketone, ethyl vinyl ketone, methyl isopropenyl ketone, etc.; itaconic diesters containing a single CH$_2$=C< grouping, e.g., the dimethyl, diethyl, dipropyl, dibutyl and other saturated aliphatic monohydric alcohol diesters of itaconic acid, diphenyl itaconate, dibenzyl itaconate, di-phenylethyl) itaconate; vinyl, allyl, and methallyl esters of saturated aliphatic monocarboxylic acids, e.g., vinyl, allyl, and methallyl acetates, vinyl, allyl, and methallyl propionates, vinyl, allyl, and methallyl valerates; vinyl thiophene; 4-vinyl pyridine; vinyl pyrrole; nitriles containing a single CH$_2$=C< grouping, e.g., acrylonitrile, methacrylonitrile, etc. Copolymerization by addition to the C=C groups may be assisted by means of a peroxy catalyst, such as hydrogen peroxide or ammonium persulfate. The emulsification and polymerization may be assisted by an emulsifying agent that serves also to stabilize the dispersion of the copolymer after completion of the copolymerization. Non-ionic emulsifiers are generally useful. Cationic emulsifiers may be used alone except when the copolymer contains acid groups. In the latter case it is preferable to use a non-ionic emulsifier alone or in conjunction with a cationic. Anionic emulsifiers may be employed except for those copolymer containing amine groups.

The consumers selected and the proportions thereof should be such as to produce a water-insoluble linear copolymer. The molecular weight of the copolymers may range from 10,000 to as high as 4,000,000.

Examples of anionic emulsifiers that may be used include the ordinary soaps such as the alkali metal, ammonium and alkanol amine salts of fatty acids including sodium oleate, potassium palmitate, ammonium stearate, ethanolamine laurate, and the like as well as rosin and dehydrated rosin acid soaps, and the synthetic saponaceous materials including the higher aliphatic sulphates and sulphonates such as sodium lauryl sulfate, sodium cetyl sulfate, the sodium salts of sulfonated paraffin oils, the sodium salts of dodecane-1-sulfonic acid, octadecane-1-sulfonic acid, etc., the alkaryl sulfonates such as the sodium alkyl aryl sulfonates such as sodium isopropyl benzene sulfonate, sodium isopropyl naphthalene sulfonate, the alkali metal salts of sulfonated dicarboxylic acid esters and amides such as sodium dioctyl sulfo-succinate, sodium N-octadecylsulfosuccinamide, sulfonated or sulfated alkyl phenoxyethoxyethanols having from 1 to 50 oxyethylene units per molecule in which the alkyl has from 4 to 18 carbon atoms, such as hexyl, n-octyl, t-octyl, lauryl, hexadecyl, octadecyl, and the like; and suitable emulsifying and dispersing agents include alkylphenoxypolyethoxyethanols having alkyl groups of about seven to eighteen carbon atoms and 6 to 60 or more oxyethylene units, such as heptylphenoxypolyethoxyethanols,
octylphenoxypolyethoxyethanols,
methyloctylphenoxypolyethoxyethanols,
nonylphenoxypolyethoxyethanols,
dodecylphenoxypolyethoxyethanols, and the like;

polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing 6 to 60 oxyethylene units per molecule; analogous ethylene oxide condensates of long-chained alcohols such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; also ethylene oxide condensates of long-chain or branched-chain amines, such as dodecylamine, hexadecylamine, and octadecylamine, containing 6 to 60 oxyethylene groups, block copolymers of ethylene oxide and propylene oxide comprising a hydrophobic propylene oxide section combined with one or more hydrophilic ethylene oxide sections.

From ½% to 8% by weight of one or more of the above emulsifiers, based on the weight of monomers or polymer, may be present.

Examples of cationic emulsifiers include trimethylstearylammonium chloride (dodecylbenzyl), trimethylammonium sulfate, and lauryl pyridinium sulfate.

Particularly valuable resin dispersions are obtained by the copolymerization in an emulsion system of at least one of the monomers mentioned above with one or more monomeric esters of acrylic and/or methacrylic acid in which the alkyl group contains 1 to 8 carbon atoms such as methyl, ethyl, n-propyl, isopropyl, n-butyl, isobutyl, sec-butyl, tert-butyl, isoamyl, tert-amyl, hexyl, heptyl, n-octyl, 2-ethylhexyl. These esters are represented by the formula

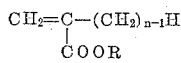

wherein $n$ is an integer having a value of 1 to 2 and R is an alkyl group having 1 to 8 carbon atoms.

The polymerizable emulsions can be prepared at temperatures from 0° C. to about 100° C., but intermediate temperatures are preferred. Thus, with the acrylic esters in which the alkyl group contains 1 to 4 carbon atoms a temperature from about 10° C. to about 60° C. is employed whereas a higher temperature; e.g., 30° C. to 80° C. is recommended when esters containing 5 to 8 carbon atoms in the alkyl group are copolymerized. Peroxidic free-radical catalysts, particularly catalytic systems of the redox type, are recommended. Such systems, as is well known, are combinations of oxidizing agents and reducing agents such as a combination of potassium persulfate and sodium metabisulfate. Other suitable peroxidic agents include the "per-salts" such as the alkali metal and ammonium persulfates and perborates, hydrogen peroxide, organic hydroperoxides, such as tert-butyl hydroperoxide and cumene hydroperoxide, and esters such as tert-butyl perbenzoate. Other reducing agents include water-soluble thiosulfates and hydrosulfites, and the salts, such as the sulfates, of metals which are capable of existing in more than one valence state such as cobalt, iron, nickel, and copper. The most convenient method of preparing the dispersions of copolymers comprises agitating an aqueous suspension or emulsion of a mixture of copolymerizable monomers and a redox catalytic combination at room temperature without the application of external heat. The amount of catalyst can vary, but for purposes of efficiency from 0.01% to 3.0% based on the weight of the monomers, of the peroxidic agent and the same or lower proportions of the reducing agent are recommended. In this way, it is possible to prepare dispersions which contain as little as 1% and as much as 60% or even more of the resinous copolymer on a weight basis. It is, however, more practical and hence preferred to produce dispersions which contain about 30 to 50% resin-solids.

After the dispersions are made, they are neutralized before the addition of the epihalohydrin. Neutralization may be effected by ammonium hydroxide, an alkali metal hydroxide, or carbonate, such as those of sodium, potassium, or lithium, or a water-soluble amine, preferably one that is fairly volatile. Examples of amines include triethylamine, trimethylamine, and triethanolamine, and the like. Preferably, the amine is a tertiary amine so that the epihalohydrin does not react with it.

The compositions of the present invention are characteristically aqueous and contain no volatile organic solvent. They accordingly involve no fire hazard or health hazard as a result of toxicity. Storage and use of the compositions accordingly require the simplest of facilities, no elaborate protective or solvent-recovery systems being required. They are also substantially odorless or at the worst, have but a slight, inoffensive odor.

Depending upon the particular purpose for which the composition is used, it may be applied to form a clear composition, or dyes or pigments may be introduced.

Any water-insoluble pigment may be used including azo-pigments and lakes, phthalocyanine pigments, vat dyestuffs in their water-insoluble form, and inorganic pigments such as carbon black, iron oxides, chrome yellows, titanium dioxide, and lithopone. Powdered or flaked metals may also be included, such as aluminum, bronze, brass, chromium, or gold. Mixtures may be used if desired.

The ratio of the pigment to the copolymer is preferably within the range of 1:1 to 1:8 by weight, but may be higher or lower if desired especially to produce novelty effects, such as for embossing. The pigment may be dispersed in the aqueous emulsion before polymerization, but is preferably dispersed into the aqueous polymer dispersion after completion of the polymerization.

In addition to the other ingredients, the aqueous dispersions may contain a water-soluble thickening agent, such as gum tragacanth, water-soluble cellulose ethers, polyvinyl alcohol or partially saponified polyvinyl acetate. The aqueous dispersions or pastes obtained with a thickening agent may contain a mild alkali, for example, sodium acetate, sodium carbonate, chalk, morpholine, or ammonia, including, if desired, a mixture of water-soluble substances which form a conventional mildly alkaline buffer. The proportions of the several ingredients in the aqueous dispersions can be varied widely, and they are adjusted in any convenient manner so that the dispersions or pastes have a consistency suitable for application to the substrate fabric by the particular technique to be employed for this purpose.

The composition may be applied in various ways depending upon the particular application. Thus, in many cases, it may be adjusted to sprayable viscosity and sprayed upon the substrate to be coated or impregnated. It may be applied by brushes, by rollers, or by squeegeeing equipment. In application to textile fabrics particularly, it may be applied by means of a textile pad. When thickened to a paste for printing textiles or other materials, stencilling systems may be employed.

Regardless of which method is employed for applying the composition to the material that is coated or impregnated, it is generally the case that no baking temperature is required to effect insolubilization of the mass deposited from the coating composition herein disclosed. Drying of the coating or impregnation may be effected simply by exposure to the ambient air at room temperature or by subjection to heated air, infra-red lamps, high-frequency induction including radio frequencies, and so on. In some cases, prolonged ageing may be required from 24 hours to a week or two before the coating or impregnant obtains its maximum resistance to solvents and heat when drying is effected at room temperature. Drying at elevated temperatures or baking after drying may be resorted to in order to hasten the complete insolubilization obtainable by use of the epihalohydrin. For example, drying at temperatures of 140° F. to about 240° F. followed by baking at 220° F. to 400° F. may be employed.

The unpigmented, undyed composition may be applied to various substrates as coatings and impregnants including paper, textiles (woven, knitted, or "non-woven" fleeces, or any other type of textile), leather, wood, metals, ceramics, glass, concrete, asbestos cement products, such as shingles, plastics, and so on. In application as coatings, the composition may be employed as the sole coating or it may be employed as a priming coating, especially for leather, or it may be employed as a top coating especially on leather or metals.

The unpigmented and undyed composition is useful for the reduction of shrinkage of wool or wool-containing fabrics on washing. It may be applied in an amount of about 1 to 15% by weight of the copolymer, based on the weight of the fabric, to reduce shrinkage on washing to an extent depending upon the amount applied. The unpigmented, undyed composition may also be applied as a binder or impregnant for the fibers of so-called "non-woven" fabrics in which the fibers or filaments are assembled in more or less haphazard array by carding, air deposition, or the like. For this purpose, anywhere from 2 to 400% by weight of the copolymer, based on the weight of fibers, may be employed. The composition on drying provides a bonded, non-woven fabric in which the binder is resistant to solvents and heat. Such bonded webs or fleeces find many uses both domestic and industrial, such as those in which they simulate textiles such as table napkins or bibs, diapers or diaper fillers, and industrial uses such as packings, gaskets, filters, and so on.

The woven, knitted, or "non-woven" fabrics to which the composition may be applied for the various purposes mentioned hereinabove may be formed of fibers or yarns comprising or made entirely of cotton, rayon, silk, wool, linen; cellulose esters, such as cellulose acetate; proteinaceous types, such as casein, soya bean protein; also linear polymeric types, such as the polyamides (nylon), polyesters, such as polyglycol terephthalate (Dacron); and the vinyl types, such as polyethylene, polyvinyl chloride, polyvinylidene chloride, polyacrylonitrile; copolymers of vinyl chloride with vinyl acetate, acrylonitrile, vinylidene chloride or the like; copolymers of vinylidene chloride with vinyl acetate, ethylene or acrylonitrile; copolymers of acrylonitrile with vinyl acetate, methacrylonitrile, vinyl pyridines, or with mixtures of the latter monomers.

After the epihalohydrin has been introduced into the aqueous dispersion of the polymer containing the reactive groups (either COOM as defined above or those defined above containing reactive hydrogen), a partial reaction may be effected between the epihalohydrin and the reactive groups. This reaction may simply occur at room temperature or it may be aided by heating up to 100° C. for a time of less than one or up to one hour or so. Advantageous results are particularly achievable when the heating is effected at about 60° C. to 65° C. for 30 minutes. In spite of this preliminary or partial reaction, the dispersion remains stable and retains its ability to form films showing that cross-linking to an insoluble and infusible condition is not obtained.

While it is not intended that the invention be limited to any particular theory of operation, it is believed that the insolubilization and increased resistance to heat results from the reaction of the epihalohydrin with the reactive groups of the polymer. Because of the fact that the polymer dispersion retains its stability even after the epihalohydrin has been added, it is possible that reaction does not occur until after the deposition of the composition such as during the drying or ageing stages, or when baking is employed, in that stage. It is, of course, possible that there may be a partial reaction of the epihalohydrin even in the polymer dispersion, but such partial reaction, if it occurs, is so limited that it does not interfere with the stability of the dispersion or with the ability of the dispersion to form a film upon drying thereof. Consequently, it appears that, if any preliminary reaction occurs in the dispersion, it is either not the type of reaction that is involved, or not as complete a reaction as that which occurs, during the drying and/or baking operations wherein a curing of cross-linking type apparently is involved.

The polymers employed may have a wide range of second order transition temperatures, which is frequently referred to in the prior art as $T_g$ or $T_i$ values.

The $T_i$ value referred to is the transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.$^2$.

This second order transition temperature $T_i$ may vary from about −50° C. to 35° C. where deposition is effected at normal temperatures up to about 25° C. to 35° C. Such products produce extremely flexible films or coatings having good adhesion or adherence to the substrates on which they may be applied. Those polymers having lower $T_i$ values in this range may be somewhat tacky on drying unless pigmented, whereas those in the upper portion of the range are generally free from tackiness even when unpigmented. The molecular weights of the polymers may be all the way from about 10,000 up to several million. Normally, higher molecular weights on the order of about 500,000 to several million are obtained unless chain transfer agents are employed, except in the case of the amines which frequently tend to produce low molecular weight polymers even without a chain transfer agent. The low molecular weight polymers are frequently desirable for adhesive applications such as when the composition is intended to be employed as a binder for the fibers or filaments of a non-woven fabric.

Polymers having higher $T_i$ values above 35° C., such as up to 60° C. or 65° C. or more, may be employed provided the drying stage is carried out at, or above, the $T_i$ value to assure film formation.

Besides being applied as impregnants and coatings as mentioned hereinabove, the composition may be formed into self-supporting films, fibers, and sheets by suitably extruding the composition into suitable coagulating media, such as a heated atmosphere, e.g. air at about 250° to 400° F., or aqueous acid, alkali, or salt solutions.

In the following examples, which are illustrative of the invention, the parts and percentages are by weight unless otherwise noted.

*Example 1*

(a) An aqueous dispersion is prepared by emulsion polymerization in the presence of t-octylphenoxypolyethoxyethanol containing about 37 ethylene oxide units, of 66% ethyl acrylate, 32.7% methyl methacrylate, and 1.3% methacrylic acid. After being neutralized with ammonium hydroxide to a pH of about 9.5, 3 parts by weight of epichlorohydrin (based on the weight of polymer) is added. This dispersion is then heated at 60° to 65° C. for 30 minutes. After it is cooled to room temperature, it is cast on a metal plate and dried at room temperature. A similar composition, except that the epichlorohydrin is omitted, is also cast on such a metal surface and dried at room temperature. Whereas the film formed of the composition which contains no epichlorohydrin dissolves in dimethylformamide, that which is formed of the composition containing the epichlorohydrin is insoluble and only swollen by dimethyl formamide.

(b) An iron oxide primer for metal is prepared by charging the following to a pebble mill:

| | Parts |
|---|---|
| Metallic brown iron oxide | 230.0 |
| Barytes | 230.0 |
| Acicular talc | 115.0 |
| Water | 179.6 |
| Ammonium salt of maleic anhydride/diisobutylene copolymer | 5.2 |
| Nonionic dispersing agent | 2.6 |
| NH$_4$OH } premix | 4.0 |
| Polyacrylic acid (25%) } premix | 9.2 |
| Defoamer | 2.4 |
| Preservative | 0.5 |
| Butoxyethyl acetate | 10.0 |

Pebble mill 16 hours, then add 534 parts of the aqueous dispersion described in (a). This primer is sprayed on a metal plate to give a film of about 1 mil thickness when dried. After drying at room temperature, the coated metal plate is baked at 250° F. for 30 minutes. Another metal plate is coated in a similar manner with a similar primer, except in this case the epichlorohydrin is omitted.

These coated metal plates are soaked in a mixture of 80% gasoline and 20% ethyl alcohol. Whereas the film formed of the primer without the epichlorohydrin is practically dissolved in a few minutes, that formed of the primer with the epichlorohydrin is untouched even after 48 hours of soaking. It softened only slightly.

(c) Epibromohydrin is substituted for epichlorohydrin in (b). This time the coated metal plates are tested for solvent resistance without baking. The results are the same as in (b); that is, the film formed of the primer without the epibromohydrin is dissolved in a few minutes, but that formed of the primer with the epibromohydrin is untouched even after 48 hours of soaking.

Example 2

(a) An aqueous dispersion is prepared by emulsion copolymerization in the presence of a t-octylphenoxypolyethoxyethanol containing about 35 to 50 ethylene oxide units of 85% by weight of ethyl acrylate, 12.5% by weight of methyl methacrylate, and 2.5% by weight of itaconic acid. After neutralization by means of potassium hydroxide, 6 parts by weight of epichlorohydrin based on the polymer is added and the dispersion is then heated at 60° to 65° C. for 30 minutes. The dispersion is then diluted to 25% total solids with water. Whereas a film obtained by casting a dispersion of the same copolymer except that the epichlorohydrin is omitted is soluble in dimethyl formamide, that obtained on deposition of the epichlorohydrin-containing dispersion is insoluble and merely swells.

(b) A 75/25 viscose (3 denier, 1 inch staple)/bleached cotton (middling, 15/16 inch) corded web weighing about 0.75 ounce/square yard is impregnated with the dispersion containing the epichlorohydrin as described in (a) at a wet pick-up of about 600% on the weight of the fibers. The web is dried 1.5 minutes at 225° F. and cured 1.5 minutes at 350° F. The resulting non-woven fabric is about 33/67 fiber/binder. A 2″ x 2″ piece is cut and placed in a container along with 100 ml. dimethyl formamide and ten ½″ diameter steel balls. The container is tumbled at room temperature for 30 minutes. The non-woven fabric is then taken out, dried, and examined. It is found to be undamaged by this treatment.

Example 3

An aqueous dispersion is prepared by emulsion copolymerization, in the presence of t-octylphenoxypolyethoxyethanol containing about 37 ethylene oxide units, of 97.2% ethyl acrylate and 2.5% itaconic acid. After neutralization by means of potassium hydroxide, 6 parts by weight of epichlorohydrin based on the polymer is added and the dispersion is then heated at 60° to 65° C. for 30 minutes. Whereas films obtained by the casting on panels of metal, glass and leather, of a dispersion of the same copolymer except that the epichlorohydrin is omitted are soluble in dimethyl formamide, those obtained on deposition of the epichlorohydrin-containing dispersion are insoluble and merely swelled.

Example 4

The procedure of Example 3 is followed using a copolymer of 83% of ethyl acrylate, 15% of methyl methacrylate, and 2% of acrylic acid. Whereas a film of the simple copolymer dispersion retains solubility in toluene, that obtained from the dispersion containing epichlorohydrin merely swells in toluene.

Example 5

The procedure of Example 3 is repeated using a copolymer of 95.7% of ethyl acrylate and 4.3% of maleic anhydride. The film formed from the simple dispersion is soluble in dimethyl formamide, whereas the film formed from the epichlorohydrin-containing dispersion is only swelled thereby.

Example 6

The procedure of Example 3 is repeated using a copolymer of 19.6% of ethyl acrylate, 78.4% vinyl acetate, and 2% of methacrylic acid. Toluene dissolves the film formed of the simple dispersion but only swells that formed of the dispersion containing epichlorohydrin.

Example 7

The procedure of Example 3 is repeated using a copolymer of 87% of ethyl acrylate, 9% of methyl methacrylate, and 4% of methacrylamide. Dimethyl formamide dissolves the film obtained from the simple dispersion, whereas it merely swells that obtained from the dispersion containing the epichlorohydrin.

Example 8

(a) An aqueous dispersion of a copolymer is obtained by the emulsion copolymerization of 92.25 parts by weight of ethyl acrylate and 7.75 parts by weight of methacrylamide in the presence of ammonium persulfate and sodium hydrosulfite and an ethylene oxide condensation product of a t-octylphenol containing from 30 to 50 oxyethylene units per molecule as an emulsifier and/or dispersing agent. Then 4 parts of epichlorohydrin and 2.6 parts of 28% $NH_4OH$ are added per 100 parts of copolymer and the mixture is heated at 50° C. for 20 minutes. A pigment (Monastral Fast Blue BFP—a phthalocyanine blue) and water-soluble hydroxyethyl cellulose are mixed into the dispersion in such amounts and the dispersion is diluted to such extent as to produce an aqueous dispersion containing 5% of the copolymer, 2.5% of the pigment, 2% of the dispersing agent, and 0.05% of the hydroxyethyl cellulose.

(b) A cotton fabric (80 x 80 sheeting) is passed through a padder containing the resulting dispersion to effect overall coloration. After drying at 240° F. and then curing at 300° F. for 10 minutes, one portion of the fabric is subjected to a wash test consisting of 40 minutes in 0.1% sodium stearate at 180° F. while tumbling, followed by several 10-minute rinses in water. Another portion is partially exposed to light in a Fade-Ometer for 50 hours and then is washed in the manner just described. The latter test is a type of "cyclic ageing" test and serves to detect any degeneration of the binder under the action of light. Such degeneration, if present, causes the removal of part of the pigment during the subsequent washing. The dyeing shows good resistance to both washing and cyclic ageing.

Example 9

The procedure of Example 8 is followed with a copolymer of 90% n-butyl acrylate and 10% 2-methylaminoethyl vinyl ether. The dyeing shows good resistance to washing and cyclic ageing.

Example 10

A dispersion of a copolymer is prepared by emulsifying 95 parts by weight of n-butyl acrylate with 5 parts by weight of 2-aminoethyl vinyl ether in about 300 parts by weight of water with about 6 parts by weight of an ethylene oxide condensation product of an octyl phenol containing between 30 and 50 oxyethylene units per molecule. To the emulsified monomers 0.3% by weight of ammonium persulfate, 0.06% of sodium hydrosulfite, and 1% triethanolamine are added to catalyze the copolymerization which is carried out for a period of about 15 minutes during which the temperature rises from 20° C. to 45° C. Then 10%, on the weight of copolymer, of epichlorohydrin, and 6.5 parts 28% $NH_4OH$ are added to the dispersion. The mixture is heated at 60° to 65° C. for 30 minutes and is then cooled.

The resin dispersion is diluted to a 13.5% concentration of the resin (copolymer) content and applied to wool flannel in a textile pad. After drying 20 minutes at 240° F., it is found that the proportion of copolymer applied to the fabric is about 10% of the weight of the fabric.

The shrinkage of the treated fabric after the 40-minute wash described hereinabove is less than 5% whereas the shrinkage of the untreated fabric is about 45%.

*Example 11*

The procedure of Example 10 is repeated substituting hydroxyethyl acrylate for the 2-aminoethyl vinyl ether. Reduced shrinkage comparable to that of Example 10 is obtained.

It is to be understood that changes and variations may be made without departing from the spirit and scope of the invention as defined by the appended claims.

I claim:

1. A composition of matter comprising an aqueous alkaline dispersion of a water-insoluble linear addition copolymer of monoethylenically unsaturated molecules, formed exclusively of atoms selected from the group consisting of carbon, hydrogen, oxygen, nitrogen, sulfur, and alkali metal atoms, and containing, in polymerized form, at least ½ mole percent of units selected from the group consisting of (1) units consisting of salts of a member selected from the group consisting of acrylic acid, methacrylic acid, itaconic acid and maleic acid containing COOM groups in which M is selected from the group consisting of $NH_4$, alkali metals, and radicals formed by neutralization of a COOH group by a water-soluble amine, and (2) units having groups having reactive hydrogen atoms selected from the group consisting of alcoholic hydroxy, primary amino, secondary amino, and amido groups, the content of the aforesaid units being insufficient to render the copolymer soluble in the aqueous alkaline medium, and ½ to 8% by weight, based on the weight of copolymer, of an emulsifier, said composition being modified by the incorporation therein of about 0.5% to 30% by weight, based on the weight of the copolymer, of an epihalohydrin selected from the group consisting of epichlorohydrin, epibromohydrin, and epiiodohydrin.

2. A composition comprising an aqueous alkaline dispersion of a water-insoluble linear copolymer of monoethylenically unsaturated molecules, formed exclusively of atoms selected from the group consisting of carbon, hydrogen, oxygen, sulfur, alkali metal, and nitrogen atoms, and comprising about ½ to 30 mole percent of units selected from the group consisting of (1) units consisting of salts of a member selected from the group consisting of acrylic acid, methacrylic acid, itaconic acid and maleic acid containing COOM groups in which M is selected from the group consisting of $NH_4$, alkali metals, and radicals formed by neutralization of a COOH group by a water-soluble amine and (2) units having groups having reactive hydrogen atoms selected from the group consisting of alcoholic hydroxyl, primary amino, secondary amino, and amido groups, the content of the aforesaid units being insufficient to render the copolymer soluble in the aqueous alkaline medium, and ½ to 8% by weight, based on the weight of copolymer, of an emulsifier, said composition being modified by the incorporation therein of an epihalohydrin selected from the group consisting of epichlorohydrin, epibromohydrin, and epiiodohydrin in an amount of about 0.5% to 30% by weight of the weight of the copolymer.

3. A composition as defined in claim 2 in which the hydrin is epichlorohydrin.

4. A composition as defined in claim 2 in which the hydrin is epibromohydrin.

5. A composition as defined in claim 2 in which the hydrin is epiiodohydrin.

6. A composition of matter comprising an aqueous alkaline dispersion of a water-insoluble linear addition copolymer, formed exclusively of atoms selected from the group consisting of carbon, hydrogen, oxygen, nitrogen, sulfur, and alkali metal atoms, of ½ to 30 mole percent of units selected from the group consisting of (1) units consisting of salts of a member selected from the group consisting of acrylic acid, methacrylic acid, itaconic acid and maleic acid containing COOM groups in which M is selected from the group consisting of $NH_4$, alkali metals, and radicals formed by neutralization of a COOH group by a water-soluble amine, and (2) units having groups having reactive hydrogen atoms selected from the group consisting of alcoholic hydroxyl, primary amino, secondary amino, and amido groups, and 99.5 to 70 mole percent of at least one ester of the formula

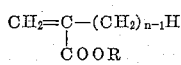

where $n$ is an integer having a value of 1 to 2 and R is an alkyl group having 1 to 8 carbon atoms, the content of the aforesaid units being insufficient to render the copolymer soluble in the aqueous alkaline medium, and ½ to 8% by weight, based on the weight of copolymer, of an emulsifier, said composition being modified by the incorporation therein of about 0.5% to 30% by weight, based on the weight of the copolymer, of an epihalohydrin selected from the group consisting of epichlorohydrin, epibromohydrin, and epiiodohydrin.

7. A composition of matter comprising an aqueous alkaline dispersion of a water-insoluble linear addition copolymer, formed exclusively of carbon, hydrogen, oxygen and nitrogen atoms, of ½ to 3 mole percent of an ammonium salt of an acid of the formula

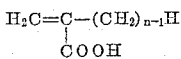

in which $n$ is an integer having a value of 1 to 2, and 99.5 to 97 mole percent of at least one ester of the formula

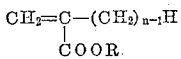

wherein $n$ is an integer having a value of 1 to 2 and R is an alkyl group having 1 to 8 carbon atoms, and ½ to 8% by weight, based on the weight of copolymer, of an emulsifier, said composition being modified by the incorporation therein of about 0.5% to 30% by weight, based on the weight of the copolymer, of epichlorohydrin.

8. A composition of matter comprising an aqueous alkaline dispersion of a water-insoluble linear addition copolymer, formed exclusively of carbon, hydrogen, oxygen and nitrogen atoms, of ½ to 3 mole percent of a salt of a water-soluble amine and an acid of the formula

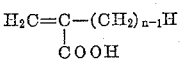

in which $n$ is an integer having a value of 1 to 2, and 99.5 to 97 mole percent of at least one ester of the formula

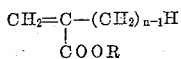

where $n$ is an integer having a value of 1 to 2 and R is an alkyl group having 1 to 8 carbon atoms, and ½ to 8% by weight, based on the weight of copolymer, of an emulsifier, said composition being modified by the incorporation therein of about 0.5% to 30% by weight, based on the weight of the copolymer, of epichlorohydrin.

9. A composition of matter comprising an aqueous alkaline dispersion of a water-insoluble linear addition copolymer, formed exclusively of carbon, hydrogen, oxygen and nitrogen atoms, of ½ to 3 mole percent of an ammonium salt of itaconic acid and 99.5 to 97 mole percent of at least one ester of the formula

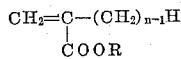

where $n$ is an integer having a value of 1 to 2 and R is an alkyl group having 1 to 8 carbon atoms, and ½ to 8% by weight, based on the weight of copolymer, of an emulsifier, said composition being modified by the incorporation therein of about 0.5% to 30% by weight, based on the weight of the copolymer, of epichlorohydrin.

10. A composition of matter comprising an aqueous alkaline dispersion of a water-insoluble linear addition copolymer, formed exclusively of carbon, hydrogen, oxygen, alkali metal, and nitrogen atoms, of ½ to 3 mole percent of an alkali metal salt of an acid of the formula

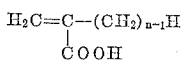

in which $n$ is an integer having a value of 1 to 2 and 99.5 to 97 mole percent of at least one ester of the formula

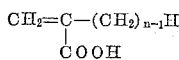

where $n$ is an integer having a value of 1 to 2 and R is an alkyl group having 1 to 8 carbon atoms, and ½ to 8% by weight, based on the weight of copolymer, of an emulsifier, said composition being modified by the incorporation therein of about 0.5 to 30% by weight, based on the weight of the copolymer, of epichlorohydrin.

11. A composition of matter comprising an aqueous alkaline dispersion of a water-insoluble linear addition copolymer, formed exclusively of carbon, hydrogen, oxygen, alkali metal, and nitrogen atoms, of ½ to 3 mole percent of an alkali metal salt of itaconic acid and 99.5 to 97 mole percent of at least one ester of the formula

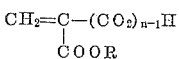

where $n$ is an integer having a value of 1 to 2 and R is an alkyl group having 1 to 8 carbon atoms, and ½ to 8% by weight, based on the weight of copolymer, of an emulsifier, said composition being modified by the incorporation therein of about 0.5% to 30% by weight, based on the weight of the copolymer, of epichlorohydrin.

12. A composition of matter comprising an aqueous alkaline dispersion of a water-insoluble linear addition copolymer of ½ to 30 mole percent of a monomer having the formula

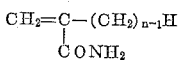

wherein $n$ is an integer having a value of 1 to 2 and 99.5 to 70 mole percent of at least one ester of the formula

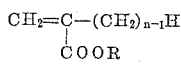

wherein $n$ is an integer having a value of 1 to 2 and R is an alkyl group having 1 to 8 carbon atoms, the content of the aforesaid monomer being insufficient to render the copolymer soluble in the aqueous alkaline medium, and ½ to 8% by weight, based on the weight of copolymer, of an emulsifier, said composition being modified by the incorporation therein of about 0.5% to 30% by weight, based on the weight of the copolymer, of epichlorohydrin.

13. A composition of matter comprising an aqueous alkaline dispersion of a water-insoluble linear addition copolymer of ½ to 30 mole percent of a monomer, formed exclusively of carbon, hydrogen, oxygen and nitrogen atoms, containing an amine group having a reactive hydrogen atom attached to the amino nitrogen atom and 99.5 to 70 mole percent of at least one ester of the formula

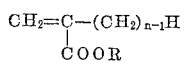

where $n$ is an integer having a value of 1 to 2 and R is an alkyl group having 1 to 8 carbon atoms, the content of the aforesaid monomer being insufficient to render the copolymer soluble in the aqueous alkaline medium, and ½ to 8% by weight, based on the weight of copolymer, of an emulsifier, said composition being modified by the incorporation therein of about 0.5% to 30% by weight, based on the weight of the copolymer, of epichlorohydrin.

14. A composition of matter comprising an aqueous alkaline dispersion of a water-insoluble linear addition copolymer of ½ to 30 mole percent of a monomer, formed exclusively of carbon, hydrogen, oxygen and nitrogen atoms, containing an alcoholic hydroxyl group and 99.5 to 70 mole percent of at least one ester of the formula

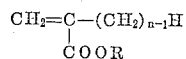

where $n$ is an integer having a value of 1 to 2 and R is an alkyl group having 1 to 8 carbon atoms, the content of the aforesaid monomer being insufficient to render the copolymer soluble in the aqueous alkaline medium, and ½ to 8% by weight, based on the weight of copolymer, of an emulsifier, said composition being modified by the incorporation therein of about 0.5% to 30% by weight, based on the weight of the copolymer, of epichlorohydrin.

15. A composition of matter comprising an aqueous alkaline dispersion of a water-insoluble linear addition copolymer of methyl methacrylate, ethyl acrylate, and ½ to 3 mole percent of potassium itaconate, said composition being modified by the incorporation therein of about 0.5% to 30% by weight, based on the weight of the copolymer, of epichlorohydrin.

16. A composition of matter comprising an aqueous alkaline dispersion of a water-insoluble linear addition copolymer of methyl methacrylate, ethyl arcylate, and ½ to 3 mole percent of potassium acrylate, said composition being modified by the incorporation therein of about 0.5% to 30% by weight, based on the weight of the copolymer, of epichlorohydrin.

17. A composition of matter comprising an aqueous alkaline dispersion of a water-insoluble linear addition copolymer of methyl methacrylate, ethyl acrylate, and ½ to 3 mole percent of ammonium methacrylate, said composition being modified by the incorporation therein of about 0.5% to 30% by weight, based on the weight of the copolymer, of epichlorohydrin.

18. A composition of matter comprising an aqueous alkaline dispersion of a water-insoluble linear addition copolymer of ethyl acrylate, and ½ to 3 mole percent of potassium itaconate, said composition being modified by the incorporation therein of about 0.5% to 30% by weight, based on the weight of the copolymer, of epichlorohydrin.

19. A composition of matter comprising an aqueous alkaline dispersion of a water-insoluble linear addition copolymer of vinyl acetate, ethyl acrylate, and ½ to 3 mole percent of potassium acrylate, said composition being modified by the incorporation therein of about 0.5% to 30% by weight, based on the weight of the copolymer, of epichlorohydrin.

References Cited in the file of this patent

UNITED STATES PATENTS

| | | |
|---|---|---|
| 2,404,781 | Arnold et al. | July 30, 1946 |
| 2,607,761 | Seymour | Aug. 19, 1952 |
| 2,724,707 | Brown | Nov. 22, 1955 |
| 2,794,010 | Jackson | May 28, 1957 |
| 2,832,746 | Jackson | Apr. 29, 1958 |

UNITED STATES PATENT OFFICE
CERTIFICATE OF CORRECTION

Patent No. 3,150,112 September 22, 1964

Walter W. Toy

It is certified that error appears in the above identified patent and that said Letters Patent are hereby corrected as shown below:

Column 4, line 20, "consumers" should read -- comonomers --. Column 9, line 18, "50" should read -- 40 --. Column 13, lines 25 to 27, the formula should appear as shown below:

$$CH_2=\underset{\underset{COOR}{|}}{C}-(CH_2)_{n-1}H$$

Signed and sealed this 24th day of March 1970.

(SEAL)
Attest:

Edward M. Fletcher, Jr.            WILLIAM E. SCHUYLER, JR.
Attesting Officer                Commissioner of Patents